United States Patent [19]

Allgaier et al.

[11] Patent Number: 4,684,432
[45] Date of Patent: Aug. 4, 1987

[54] ROTARY MOLDING MACHINE

[75] Inventors: Wayne F. Allgaier, Utica; Gerard M. Tyjenski, Warren; Claude A. Di Natale, Grosse Pointe Farms, all of Mich.

[73] Assignee: General Motors Corporation, Detroit, Mich.

[21] Appl. No.: 519,027

[22] Filed: Aug. 1, 1983

[51] Int. Cl.⁴ .............................................. B32B 23/02
[52] U.S. Cl. ................................ 156/500; 425/348 R; 425/350
[58] Field of Search ................ 156/500; 425/296, 343, 425/346, 348 R, 350

[56] References Cited

U.S. PATENT DOCUMENTS 1,801,893  4/1931  Wisner .................................. 425/346
3,543,335 12/1970  Meyer ................................... 425/346
3,611,517 10/1971  Giersberg et al. .................... 425/346
3,873,399  3/1975  Goldsworthy et al. ............. 156/500

OTHER PUBLICATIONS

"Reinforced Composite Parts", Plastics World, Feb. 1981, R. W. Blatt.

Primary Examiner—Jay H. Woo
Assistant Examiner—Timothy W. Heitbrink
Attorney, Agent, or Firm—George A. Grove

[57] ABSTRACT

A rotary machine for molding continuous resin coated, glass fiber bundles having a turntable carrying open-ended, open and closable molds to shape the bundles and a C-frame press adjacent the turntable and reciprocally movable along a portion of the mold path to sequentially engage each mold to subject molding pressure to the glass fiber bundle in it.

3 Claims, 6 Drawing Figures

ROTARY MOLDING MACHINE

This invention relates to the compression molding of continuous fiber-reinforced plastic bodies in molds rotating in a circular path on the periphery of a turntable. More particularly, this invention relates to an improved rotary machine for continually compression molding bundles of endless resin impregnated fibers.

A variety of processes have been devised for molding articles from bundles of long resin impregnated glass fibers. When properly molded, such articles are quite strong and may be employed as automotive structural members, such as leaf springs, bumper beams, frames and other support members.

One way of producing leaf springs is by filament winding. In filament winding, a bundle of thermosetting resin coated glass fiber rovings are wound into two or more open-ended female molds. Epoxy resins and polyester resins have been used for this purpose. When a mold has been filled by windings it is capped and heated to cure the resin. The resulting glass fiber-reinforced product is very strong. The winding process can produce a variety of shapes, including curved articles of constant or varying radius. However, the winding process is a batch type process and it would be desirable to devise a continuous process of like utility.

Goldsworthy et al U.S. Pat. No. 3,873,399 describes a molding apparatus having curved, open-ended female molds rotating in a circular path at the periphery of a turntable. Continuous resin impregnated glass fibers are drawn into an open-ended mold by the rotation of the mold. Each mold moves past a stationary cover die which helps define the cross-section of the article to be formed. The cover die has a radius corresponding to that of the rotating mold piece. The mold pieces are heated and the resin is cured to form a finished, curved article of constant radius along its length. This process offers the advantages of a continuous process, but it is limited as to the curvature of the articles that may be formed.

It is an object of the present invention to provide a rotary compression molding machine for manufacturing continuous fiber-reinforced plastic structural components that need not be of uniform curvature. In addition, our machine can be used to make articles of variable cross-sectional area.

It is a more specific object of our invention to provide a rotary molding machine with a plurality of two-piece, open-ended molds mounted at the periphery of a turntable that are adapted to continually draw a plurality of resin impregnated glass rovings into an open-ended mold cavity, close on the fibers, and then pass between the operative members of a movable press for compression molding of the article. Cores or other filler bodies can be placed in the cavity with the fibers to produce articles of variable cross-sectional area. The article need not be curved or of uniform curvature.

BRIEF SUMMARY OF THE INVENTION

In accordance with a preferred embodiment of our invention, these and other objects and advantages are accomplished as follows.

Our machine comprises a turntable rotatable about a central vertical axis. A plurality of molds are mounted at the periphery of the turntable, preferably uniformly spaced from each other about the periphery. The molds are rotatable with the turntable in a common circular path about the axis of rotation. Each mold comprises at least two cooperative cavity defining members that are movable in a radial direction with respect to the path of rotation between mold-open and mold-closed positions. Each mold defines an open-ended cavity. The mold cavity may vary in shape along its length. If the cavity is to be filled solely with a constant number of resin impregnated fibers, it must be of substantially constant cross-sectional area. The cavity may have a varying cross-sectional area if separate cores or fillers are to be placed in it along with a bundle of fibers.

One or more articles are formed in each mold and the operation is completed during a single rotation of the machine. The cavity may define a straight article or a curved article so long as the mold in its open position is capable of receiving a bundle of resin impregnated fibers in the radially inward mold member as the mold rotates. Obviously, the mold cavity is first filled from the forward end with respect to its direction of rotation. When the fibers (and cores or fillers, if desired) have been laid into the inward mold (the female mold) the other mold member closes to begin the compression.

As each filled and closed mold rotates, it passes between the jaws of the C-frame press adjacent the turntable. This press is reciprocally movable along a portion of the mold path. It moves opposite the direction of rotation to meet a just-closed mold. It closes on the mold to exert a suitably high molding pressure and it moves with the mold. It travels with the mold, exerting molding pressure for a suitable portion of the mold path. The press then opens and allows the mold to continue on its rotation while the press moves back to meet the next mold.

At this point the cured article may be cut off from the mold behind it by severing the section of fibers that joins them. The article is then ejected from the mold. The empty mold is cleaned or lubricated or otherwise prepared to repeat the molding cycle.

Our molding process is carried out on continuous glass fibers that are resin impregnated and collected into a bundle of suitable cross-sectional area. Such bundles are formed and used in a number of prior art molding and extruding practices. In other words, it is known how to prepare the molding material used in the operation of our machine. However, our machine is new and it provides means for efficiently and continuously molding a variety of shapes from endless glass fibers.

Other benefits of our invention will become more apparent from a detailed description thereof which follows. Reference will be made to the drawings in which.

The subject rotary molding machine is intended for use in molding continuous glass fiber-reinforced thermosetting resin articles, such as automotive leaf springs, frame members and the like. The molding operation is performed on a bundle of resin impregnated glass fibers. Since there is the same number of glass fibers throughout the length of the article it necessarily has substantially the same cross-sectional area although the shape may change along the length of the body.

Methods of preparing resin impregnated fibers are well known. A suitable practice will be summarized here to better understand the use of our machine. Strands of many individual glass fibers are commercially available. They come wound on spools or bobbins. A suitable number of spools are mounted on a creel or a rack to supply a sufficient number of strands to make up the cross-section of the article to be produced. As a spool runs out, the end can be tied to the end of a new spool so that the process can be operated continuously. The plurality of strands are guided into a bath of the thermosetting resin to be used. Typically, the resin is an epoxy based resin or a polyester resin. Preferably, the strands are flexed or otherwise manipulated in the bath so that the liquid resin thoroughly wets each strand and fiber therein.

As the many strands are pulled from the bath they are usually drawn together through a sqeeze-out die to remove excess resin. The strands, thus collected together in a bundle, may be preheated to a temperature that prepares the resin for more rapid cure in the final forming mold. While any suitable heating means may be employed, a radio frequency heating unit is efficient and clean. The preheated bundle of fibers may then be drawn through a preformed stage in which they are more or less collected and aligned to facilitate drawing into the final forming mold. At this point the continuous fiber bundle is ready to be drawn into a mold of the subject rotary machine.

Figure 1:
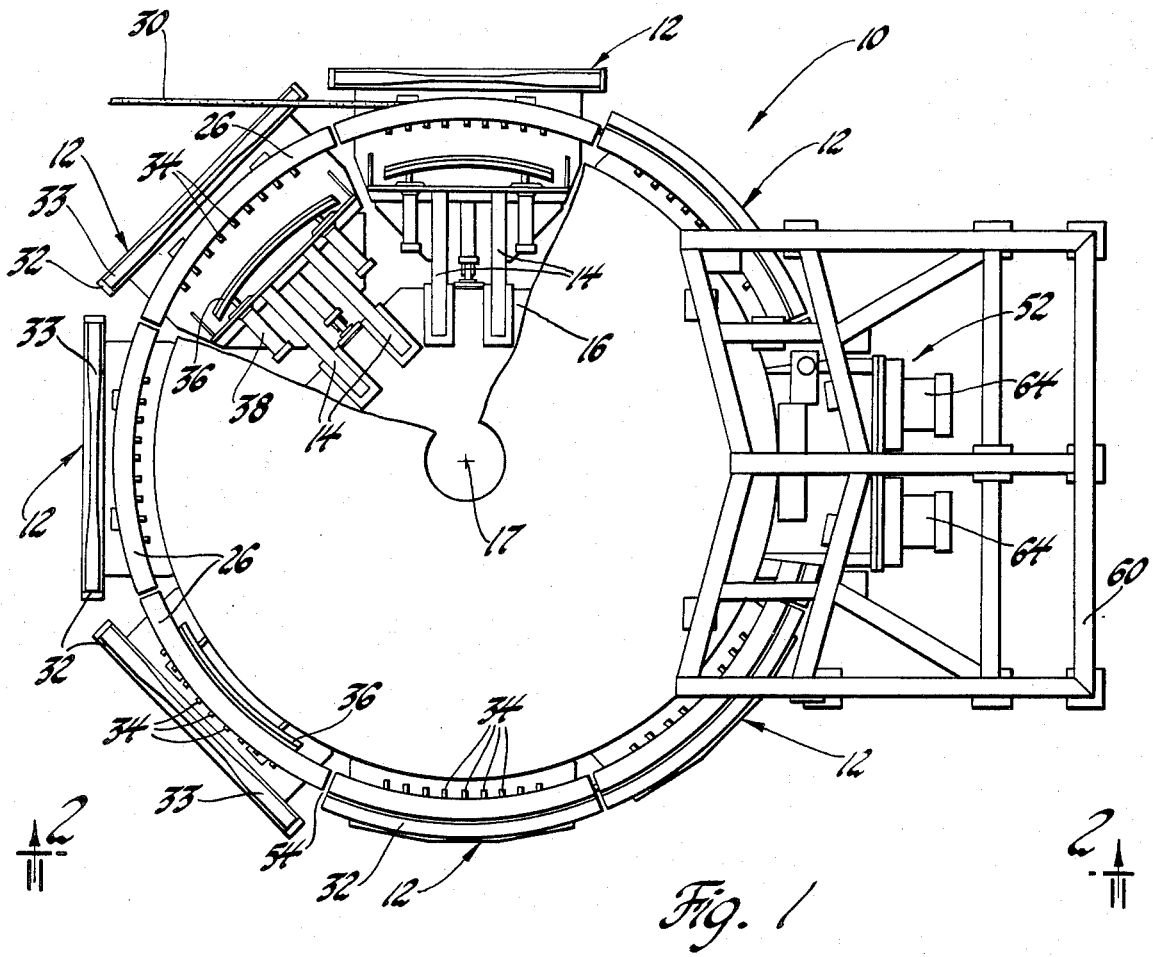
FIG. 1 is a top view of a subject rotary molding machine.
Figure 2:
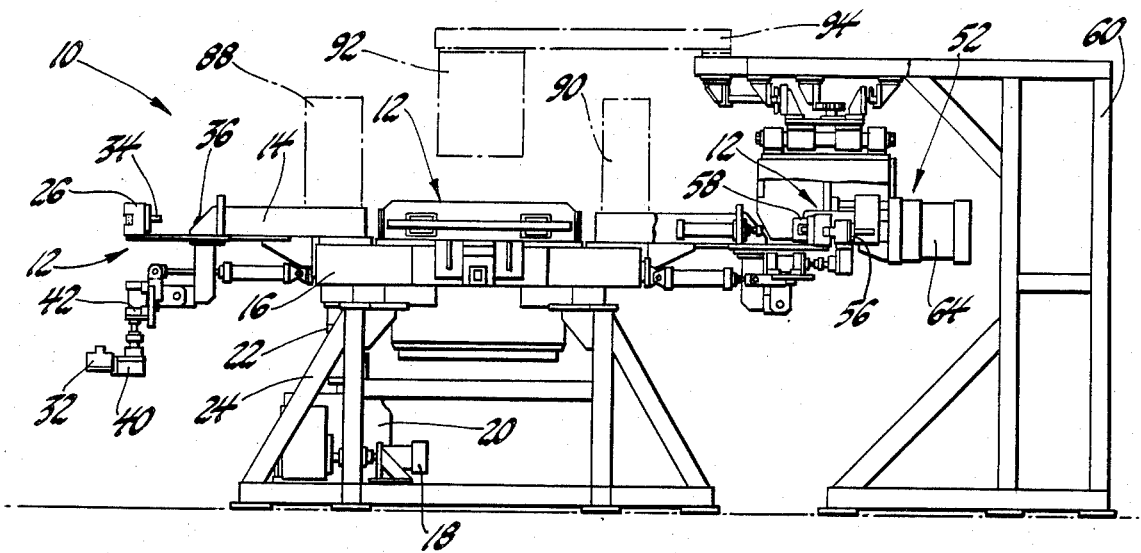
FIG. 2 is an elevational view of the subject rotary molding machine.

Referring to FIGS. 1 and 2 of the drawings, our rotary molding machine 10 comprises eight substantially identical molds 12 mounted by arms 14 to a horizontal turntable block 16. The turntable 16 is rotatable about a central vertical axis 17. The turntable is driven by a motor 18 through a speed reducer 20 and gears 22. A suitable support structure 24 for the turntable is provided.

Only two molds 12 are shown in detail in FIG. 1 so that the figure would not be too cluttered.

The turntable 16 is octagonal in configuration and the eight molds 12 are equally spaced from each other about the periphery of the table. The molds are positioned so that they travel in a common circular path as they rotate with the table about the axis.

Figure 3:
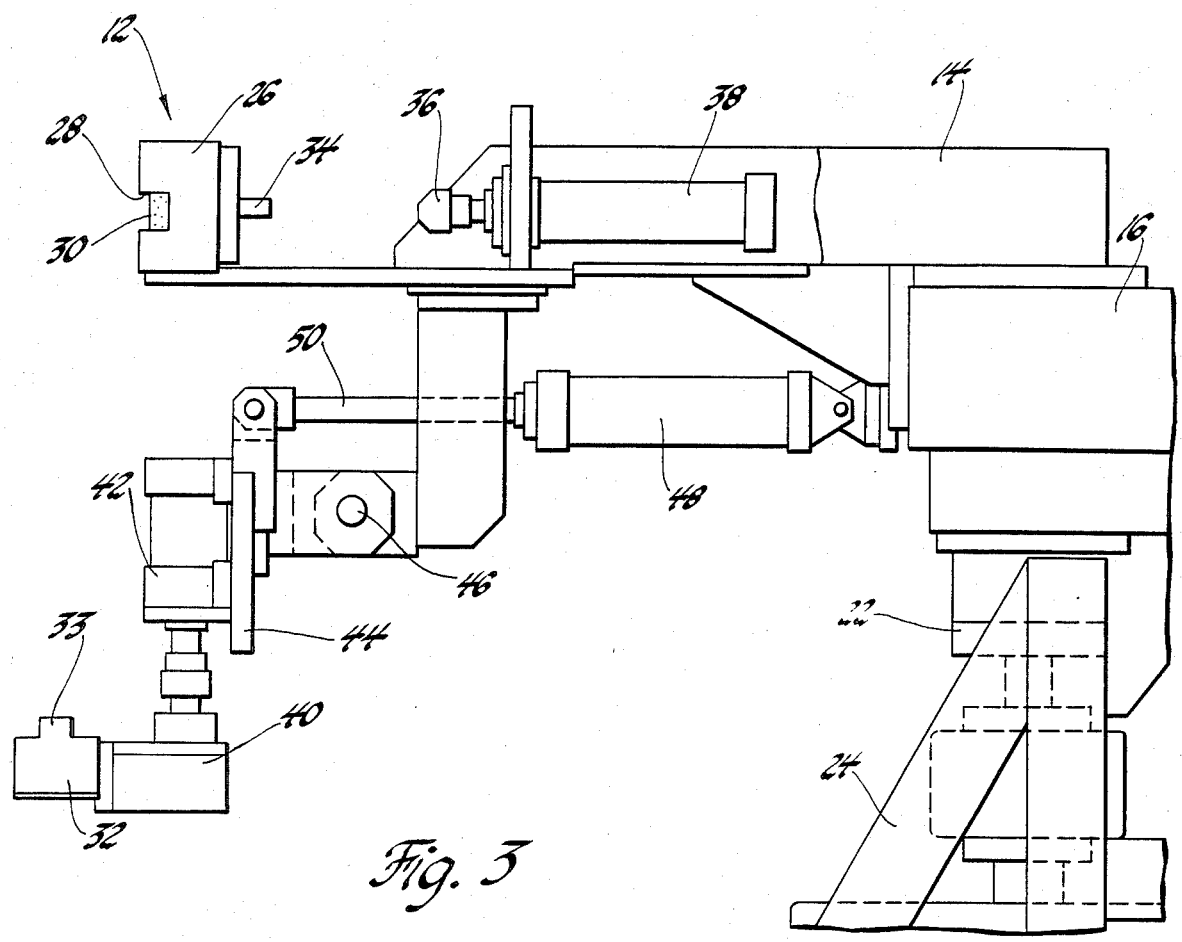
FIG. 3 is a side view of one mold and a portion of the turntable. The mold is in the open position.
Figure 4:
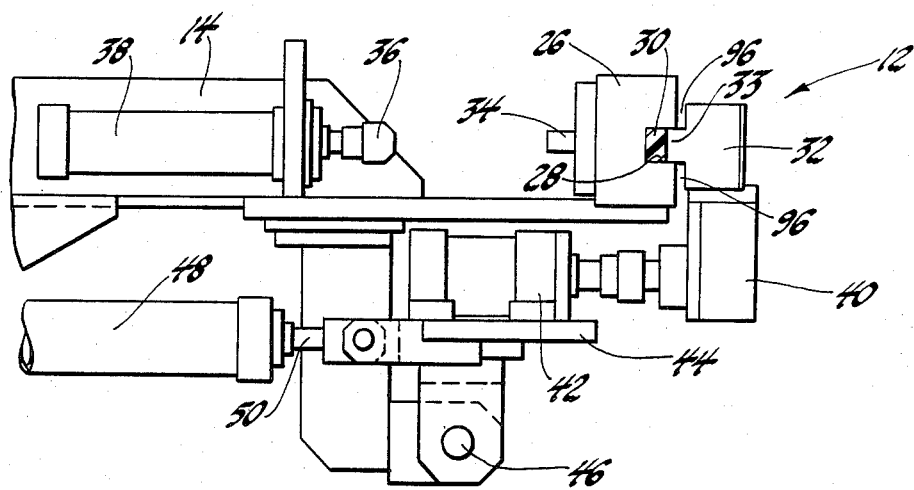
FIG. 4 is similar to FIG. 3 except that the mold is shown in the closed position.

FIGS. 3 and 4 illustrate a representative mold in larger detail. Each mold 12 comprises a radially inner mold portion 26, which in this instance is a female mold. It has a cavity 28 that extends the length of the mold portion 26 so that it is open-ended. In FIGS. 3 and 4 the cavity 28 is shown containing a fiber bundle 30. A companion mold portion 32 serves to close the mold with closure or male portion 33 and completely define the mold cavity when a bundle 30 of resin impregnated fibers has been drawn into the mold. As seen in FIG. 1, male portion 33, like the complementary cavity 28 that it closes, may vary in shape along its length. In FIG. 3 the mold members 26 and 32 are shown in the mold-open position. The inner mold is rigidly supported on an arm 14 extending from the turntable block 16. At its radially inward or back side, each mold has a plurality (nine shown in FIG. 1) of eject pins 34. Inboard of the mold portion 26 and eject pins 34 is a long eject bar 36 which is actuatable by an eject hydraulic cylinder 38 to push against eject pins 34 and eject a molded body from the inner mold cavity 28.

The outer mold portion 32 may be moved radially outwardly from contact with the inner mold 26 and also dropped below the plane of the inner mold cavity. The outer mold 32 is carried on a mold slide 40 which is actuated by a hydraulic cylinder 42. The cylinder is carried on an outer mold support plate 44 which can be pivoted about a joint 46 and dropped below the inner mold by means of a pivot hydraulic cylinder 48 and piston rod 50. Thus, when a sector of resin impregnated fiber strands are being drawn into the open-ended inner mold, the outer mold is urged away from the inner mold and dropped below it to accommodate mold filling. While the mold is open and is being filled with the fiber bundle, additional filler bodies or cores could be placed in the cavity if it is desired to form a body that varies in cross-sectional area along its length.

FIG. 4 shows the mold 12 in the closed position, with the outer mold portion 32 urged against the fiber bundle 30 collected in the inner mold 26 by action of the outer mold slide cylinder 42.

It will be appreciated that by using a plurality of identical molds 12 (here, eight) sequential molding operations are undertaken in each mold at its different positions of rotation on the machine. As shown in FIG. 1, a bundle 30 of effectively endless fiber strands are drawn into an open mold 12 at the top of this figure. As the turntable 16 rotates, the fibers are wrapped into the cavity 28 of the inner female mold 26 portion. As the mold cavity is filled, the outer mold member 32 closes, as is indicated (FIG. 1) in the mold shown at a position about 45° away from the top mold in a clockwise direction. The molds are heated (by means not shown) to promote the curing of the resin. In order to further consolidate the fiber bundle 30 we employ a hydraulic press 52 which acts on a closed mold 12 during a portion of each cycle of rotation of the mold. The operation of this press 52 will be described in more detail below.

After a mold 12 is carried from the press 52, further heating and curing takes place during a portion of the rotation of the mold on the turntable. At the position indicated at 54 in FIG. 1 a saw cut is made through the fiber bundle between the subject mold and the one behind it in the direction of rotation to separate the molded product from the fiber bundle. The outer mold 32 is opened and the eject bar 36 actuated to eject the molded part. The ejected part may then be trimmed, cleaned and otherwise processed to produce a suitable finished part. During the remainder of a single rotation of the turntable the open mold may be cleaned and coated with a release agent if desired. Thus, during one cycle of our rotary machine a bundle of resin impregnated fibers is pulled into the cavity in the inner mold; the mold is closed and heated; pressure is applied by a movable hydraulic press on the closed mold; pressure is then released; and the molded part is severed from the following mold and it is ejected from the mold.

As depicted in FIG. 1, the outer configuration of the mold pieces is circular, conforming to the circular path that they define during a rotation of the turntable. This circular configuration is preferred so that the molds may pass between and through, and be effectively compressed by the ram 56 and anvil 58 members (FIGS. 2 and 5) of a movable C-frame hydraulic press 52. However, although the outer configuration of the molds is generally circular, the longitudinal cavity defined by the mold pieces does not have to be circular. The cavity may define a straight part or a curved part. The curved part does not have to be an arc of a circle of constant radius. The cross-section of the part may, of course, be varied in any way practical to be accommodated by a bundle of continuous fibers.

Figure 5:
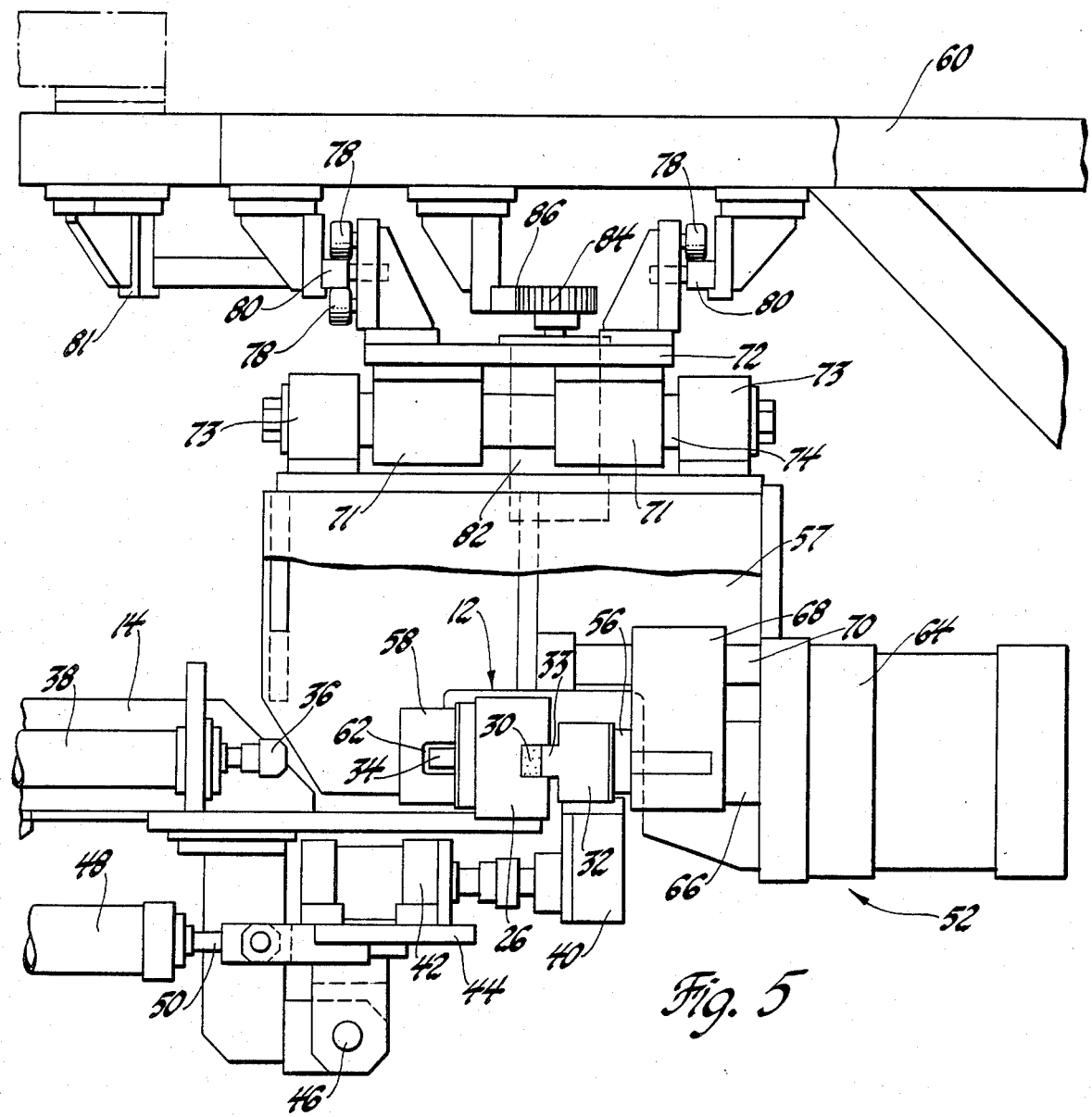
FIG. 5 is a side view of the C-frame press and a portion of its supporting structure. The press is in its closed position in engagement with a mold assembly.

Referring to FIGS. 1, 2 and 5, the hydraulic C-frame press is carried by a suitable stationary support structure 60 so that the operative press members lie adjacent the circular path taken by a closed mold. The C-frame comprises a press anvil member 58, a press ram member 56 and back frame structure 57 to complete the "C". Back frame 57 is a substantial structure designed to support the weight of the press members, such as cylinders 64, as well as the large reaction forces when the press is compressing a mold. The anvil member 58 is shaped to fit against the curved back, radially inward side, of the inner mold 26. Here, anvil 58 is about three-quarters of the length of the inner mold. The anvil 58 has a groove 62 to accommodate the heads of the eject pins 34 protruding from back of the inner mold 26. The ram member 56 is likewise curved to fit against the back, the radially outward side, of the outer mold member 32 when the mold is in the closed configuration. In this case, the ram 56 is about three-quarters of the length of the outer mold 32. The anvil is rigidly supported by frame 57. Ram 56 is mounted on press ram slide 68 and guided on press frame by guide rods 70. The ram 56 is actuated by two suitable hydraulic cylinders 64 and pistons 66, also attached to frame 57. When the ram member of the press is withdrawn (i.e., the press is open), a closed, curved mold member 12 will just pass through the space between the ram and the anvil. When the ram is advanced, it, of course, tightly engages and strongly presses against a closed mold member to effect adequate consolidation of the article being molded.

As seen in FIG. 5, press 52 is hung from support structure 60 on press subplate 72. Depending from subplate 72 are two sets of two pillow blocks 71. Each set of depending pillow blocks 71 carries a guide rod 74. Blocks 71 are provided with suitable bearings and lubrication (not shown) so that guide rods 74 can slide back and forth in the blocks. The two sets of depending pillow blocks 71 are spaced on subplate 72 so as to overlie the press hydraulic cylinders 64 when the press is in position. Extending upwardly from back frame 57 are two corresponding sets of two pillow blocks 73 which receive guide rods 74 and are affixed to it. Thus, press 52 is suspended from frame 60 on guide rods 74 and can be moved radially with respect to the adjacent turntable and molds.

Figure 6:
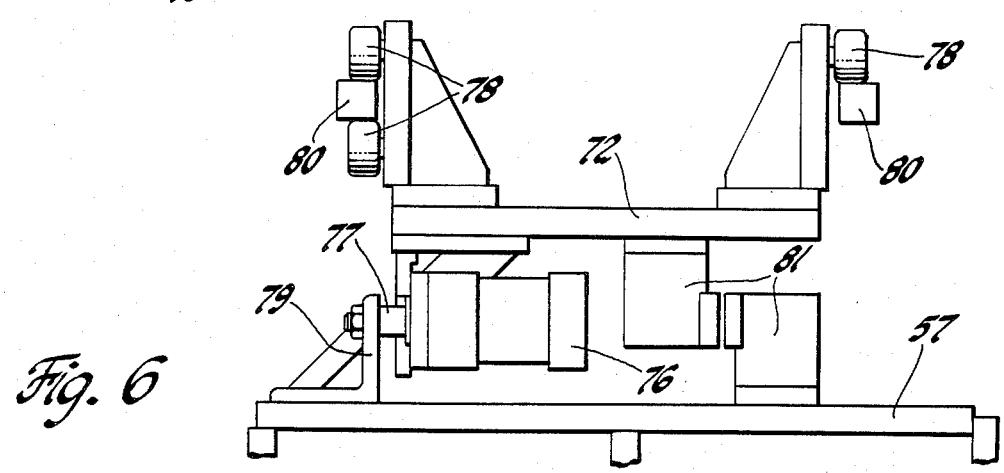
FIG. 6 is a side view of a portion of the press construction showing the hydraulic cylinder and related structure used to move the press radially with respect to the mold turntable.

FIG. 6 illustrates the means for movement of press 52 radially with respect to the axis of the turntable. Depending from subplate 72 and midway between guide rods 74 is a hydraulic cylinder 76. Piston rod 77 of hydraulic cylinder 76 is connected to a suitable bracket 79 affixed to press back frame 57. Thus, the hydraulic cylinder 76 can be actuated to move the press slightly in a radially inwardly or outwardly direction with respect to the axis of the turntable. Two stops 81, one affixed to subplate 72 and one to frame 57, control the maximum radially inward displacement of the press. Thus, by actuation of cylinder 76 the whole press can be moved a short distance radially inwardly to space anvil 58 from the back side of the mold assembly when press hydraulic cylinder 64 retracts anvil member 56. This combination of movement places the press in its open position and permits a closed mold assembly on the turntable to rotate between the anvil and the ram.

Subplate 72 is hung from press support frame 60 by rollers 78 on circular tracks 80. The track radii are established from the turntable centerline. The press 52 and press subplate 72 are rotated counterclockwise (FIG. 1) about the turntable centerline on tracks 80 by a hydraulic motor 82 through a pinion gear 84 engaging curved gear rack 86. The radially inward track 80 is provided additional support by brace 81.

Thus, although the support frame is substantially stationary, the press can travel through, for example, 45° to 90° of arc of the circular path taken by the molds. Movement of the press can be effected by the motor 82. Thus, the press may be moved in a counterclockwise direction, as seen in FIG. 1, to meet a mold which has just been filled with a fiber bundle and closed. The press then closes on the mold. This is accomplished by operation of cylinder 76 and cylinder 64 to respectively move the press 52 radially outward until anvil 58 rests against the back of the inner mold 26 and the ram 56 presses against the back of outer mold 32. The press 52 asserts molding pressure, and travels with the mold as it is driven by the turntable for a sufficient period of time to provide the desired consolidation of the molded part. The press can then be opened by cylinders 64 and 76, allowing the mold to move on. The direction of movement of the press is reversed by motor 82 and it retreats to engage another mold.

Hydraulic and electrical circuits have not been shown in the drawings so that the mechanical details pertaining directly to the invention could be more clearly illustrated. However, fluid circuits for the hydraulic cylinders are connected to valves mounted on a manifold 88 on the turntable 16. Connections to the manifold pass through rotating unions mounted on the turntable centerline down through a hole in the center block, and out the support table base to an externally located hydraulic power supply unit. Fluid circuits for the hydraulic cylinders and motor on the press and for the turntable motor are connected to manifolds near the externally located hydraulic power supply unit.

Electrical power for the limit switches, hydraulic valve solenoids, and mold heating passes through a control box 90 mounted on the turntable. Connections to the control box pass through slip rings 92 mounted on the turntable centerline, up through conduit on an overhead conduit support frame 94 to an externally located electrical power supply unit. Power for the limit switches, hydraulic valve solenoids, press motor, and turntable motor pass directly to the externally located electrical control unit.

The following operation sequence describes the mechanical actions that occur on one mold. The sequence for the other molds is identical, only separated by 45° increments.

The molds 12 are heated electrically until stabilized at the set point temperature. The turntable 16 is rotated clockwise (as viewed in FIG. 1) continuously by the hydraulic turntable motor 18. The straight, preheated, resin impregnated fiber bundle 30 is pulled from upstream devices and wrapped into the heated inner mold cavity 28 by the rotating action. During mold filling, cores or other filler bodies may be placed in the mold cavity by any suitable means. In this way, articles of varying cross-sectional area can be formed. If fillers are not added, a constant cross-sectional area article can be produced. When the trailing mold end passes the fiber bundle and inner mold cavity tangent point, the outer mold member 32 is pivoted by pivot cylinder 48 to swing up the outer mold 32. The outer mold slide 40 is advanced by slide cylinder 42 to engage the mold pair and start matrix compression.

The press subplate 72 is rotated by motor 82 counterclockwise (as viewed in FIG. 1) about the turntable centerline to bring the press 52 above and around the mold pair. The press is open. Ram 56 is retracted and the press is moved radially inward by cylinder 76. When the press is aligned with a mold, the press frame-to-subplate cylinder 76 is released to allow the press to flow radially. The press ram slide 68 is advanced by the ram slide cylinders 64 to apply high compression force on the fiber/resin matrix. The press rotates clockwise about the turntable centerline by being clamped onto the molds and driven by the turntable (i.e., motor 82 is inactivated). The matrix is compressed until the exact part thickness is obtained. This can be accomplished by use of suitable mold stops between the mold portions in region 96 in FIG. 4. During such compression, excess resin will run out the mold ends and the gap between the inner mold cavity and the outer mold.

The press ram slide 68 is returned by the ram slide cylinders 64 to release the high compression force. The press frame-to-subplate cylinder 76 is advanced to move the press anvil 58 away from the inner mold back surface. The press subplate and press are rotated counterclockwise again about the turntable centerline to the next mold.

The molds are kept closed during resin polymerization by the outer mold slide cylinders 42. After sufficient cure time, the bundle is cut between the mold ends to separate the cured part from the uncured matrix. The outer mold slide 40 is retracted by the outer mold cylinders 42 to open the mold. The outer mold support plate 44 is pivoted by pivot cylinder 48 to swing the outer mold down. The part stays in the inner mold cavity. The eject bar 36 is advanced by eject cylinders 38 to push the eject pins 34 in the back of the inner mold 26. The eject pins 34 eject the part from the inner mold. The eject bar is returned by the eject cylinders. The mold surfaces are prepared for repetition of the molding sequence by cleaning and applying a mold release.

While our invention has been described in terms of a specific embodiment thereof, it will be appreciated that other forms could readily be adapted by one skilled in the art. Accordingly, the scope of our invention is to be considered limited only by the following claims.

The embodiments of the invention in which an exclusive property or privilege is claimed are defined as follows:

1. A machine for molding continuous fiber-reinforced plastic bodies, comprising
    a horizontal turntable rotatable about a central vertical axis,
    a plurality of molds carried by the turntable and rotatable with it in a common circular path about said axis, each mold comprising two cavity defining members at least one of which is movable radially with respect to said path between open and closed positions, such members of each mold defining an open-ended cavity so that each mold may successively receive a segment of a bundle of endless resin coated fibers when in the mold-open position and squeeze the trapped bundle segment into a desired shape in the mold-closed position,
    means for rotating the mold turntable, and
    a C-frame press adjacent the turntable and supported so as to be reciprocally movable along an arc of the circular mold path, the press comprising an anvil member, a ram member and hydraulic means for opening and closing said members and applying compressive force between them, the said anvil and ram members straddling the mold path and when open adapted to receive in turn each mold when it is closed and thereafter to close upon and compress the mold, the press being movable along said arc opposite the direction of turntable rotation to receive a mold and thereafter movable along the arc with the mold and turntable during press compression operation.

2. A machine for molding continuous fiber-reinforced plastic bodies, comprising
    a horizontal turntable rotatable about a central vertical axis,
    a plurality of molds carried by the turntable and rotatable with it in a common circular path about said axis, each mold comprising a radially inward, open-ended cavity defining member and radially outward closure member, the closure member being movable from a mold-closed position radially outwardly from the cavity defining member and pivoted above or below said cavity in a mold-open position so that each mold may as it is rotated successively wrap in a segment of a bundle of endless resin coated fibers when in the mold-open position,
    means for rotating the mold turntable, and
    a C-frame press adjacent the turntable and reciprocally movable along a portion of the circular mold path, said press having an anvil member and a ram member adapted to apply molding pressure to a closed mold in a radial direction with respect to said circular path while said press is being moved with said mold in said path.

3. A machine for molding continuous fiber-reinforced plastic bodies, comprising
    a horizontal turntable rotatable about a central vertical axis,
    a plurality of molds carried by the turntable and rotatable with it in a common circular path about said axis, each mold comprising two cavity defining members at least one of which is movable radially with respect to said path between open and closed positions, such members of each mold defining an open-ended cavity so that each mold may successively receive a segment of a bundle of endless resin coated fibers when in the mold-open position and squeeze the trapped bundle segment into a desired shape in the mold-closed position,
    means for rotating the mold turntable, and
    a C-frame press adjacent the turntable and reciprocally movable along a portion of the circular mold path, said press having an anvil member and a ram member adapted to apply molding pressure to a closed mold in a radial direction with respect to said circular path while said press is being moved with said mold in said path.

* * * * *